(12) United States Patent
Mouli

(10) Patent No.: US 8,078,018 B2
(45) Date of Patent: Dec. 13, 2011

(54) COMMUNICATION METHODS, METHODS OF FORMING AN INTERCONNECT, SIGNAL INTERCONNECTS, INTEGRATED CIRCUIT STRUCTURES, CIRCUITS, AND DATA APPARATUSES

(75) Inventor: Chandra Mouli, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 12/955,780

(22) Filed: Nov. 29, 2010

(65) Prior Publication Data

US 2011/0069926 A1    Mar. 24, 2011

Related U.S. Application Data

(63) Continuation of application No. 11/515,296, filed on Aug. 31, 2006, now Pat. No. 7,844,142.

(51) Int. Cl.
*G02B 6/12* (2006.01)
*H04J 14/00* (2006.01)
*H01L 21/00* (2006.01)
*H01R 33/945* (2006.01)

(52) U.S. Cl. ............ 385/14; 385/53; 385/88; 385/89; 385/129; 385/130; 398/79; 438/29; 438/31; 439/577

(58) Field of Classification Search .......... 385/14, 385/53, 88, 89, 92, 101, 129, 130, 131, 132, 385/122; 439/577; 398/79; 438/29, 31; 380/259

See application file for complete search history.

(56) References Cited

U.S. PATENT DOCUMENTS

| | | | |
|---|---|---|---|
| 5,562,838 A | 10/1996 | Wojnarowski et al. | 216/24 |
| 5,659,648 A | 8/1997 | Knapp et al. | 385/129 |
| 5,793,909 A | 8/1998 | Leone et al. | 385/24 |
| 6,539,156 B1 | 3/2003 | Dickson et al. | 385/129 |
| 6,821,146 B2 | 11/2004 | Tolmie | 439/577 |
| 6,843,606 B2 | 1/2005 | Deane et al. | 385/92 |
| 6,862,396 B2 | 3/2005 | Dickson et al. | 385/141 |
| 6,947,634 B2 | 9/2005 | Tanaka et al. | 385/31 |
| 7,170,142 B2 | 1/2007 | Wojick et al. | 257/449 |
| 7,215,845 B1 | 5/2007 | Chan et al. | 385/24 |
| 7,366,373 B2 | 4/2008 | Hyde et al. | 385/30 |
| 7,427,165 B2 | 9/2008 | Benaron et al. | 385/75 |
| 7,447,396 B2 | 11/2008 | Hyde et al. | 385/16 |

(Continued)

FOREIGN PATENT DOCUMENTS

WO    WO 2004070990 A2 *    8/2004

OTHER PUBLICATIONS

Fine tuning work function of indium tin oxide by surface molecular desing: Enhanced hole injection in organic electroluminescent devices; Ganzorig et al.; Applied Physics Letters vol. 79 No. 2 Jul. 9, 2001 pp. 272-274.

(Continued)

*Primary Examiner* — Brian Healy
(74) *Attorney, Agent, or Firm* — Wells St. John, P.S.

(57) ABSTRACT

Some embodiments include communication methods, methods of forming an interconnect, signal interconnects, integrated circuit structures, circuits, and data apparatuses. In one embodiment, a communication method includes accessing an optical signal comprising photons to communicate information, accessing an electrical signal comprising electrical data carriers to communicate information, and using a single interconnect, communicating the optical and electrical signals between a first spatial location and a second spatial location spaced from the first spatial location.

44 Claims, 3 Drawing Sheets

U.S. PATENT DOCUMENTS

| | | |
|---|---|---|
| 7,454,095 B2 | 11/2008 | Baehr-Jones et al. ............ 385/14 |
| 7,466,884 B2 * | 12/2008 | Beausoleil ...................... 385/49 |
| 7,583,882 B2 | 9/2009 | Guo .............................. 385/131 |
| 7,844,142 B2 * | 11/2010 | Mouli ............................. 385/14 |
| 2002/0025101 A1 | 2/2002 | Kaatz ............................. 385/14 |
| 2003/0147616 A1 | 8/2003 | Dickson et al. ............... 385/129 |
| 2005/0104684 A1 | 5/2005 | Wojick et al. ................. 333/108 |
| 2005/0111777 A1 | 5/2005 | Stenger et al. .................. 385/14 |
| 2005/0263675 A1 | 12/2005 | Mouli ........................ 250/208.1 |
| 2005/0281524 A1 | 12/2005 | Mouli ........................... 359/129 |
| 2006/0006485 A1 | 1/2006 | Mouli ........................... 257/432 |
| 2006/0050780 A1 * | 3/2006 | Cooper et al. ........... 375/240.01 |
| 2006/0186318 A1 | 8/2006 | Mouli ........................ 250/208.1 |
| 2006/0186319 A1 | 8/2006 | Mouli ........................ 250/208.1 |
| 2008/0069359 A1 | 3/2008 | Mouli ........................... 380/259 |
| 2008/0080807 A1 | 4/2008 | Kim et al. ....................... 385/14 |

OTHER PUBLICATIONS

"A high-speed silicon optical modulator based on metal-oxide semiconductor capacity"; Liu et al.; Nature; vol. 427; Feb. 12, 2004; pp. 615-618.

"Work function of indium tin oxide transparent conductor mesured by photoelectron spectroscopy"; Park et al.; Applied Physics Letter 68 (19) May 6, 1996; pp. 2699-2701.

* cited by examiner

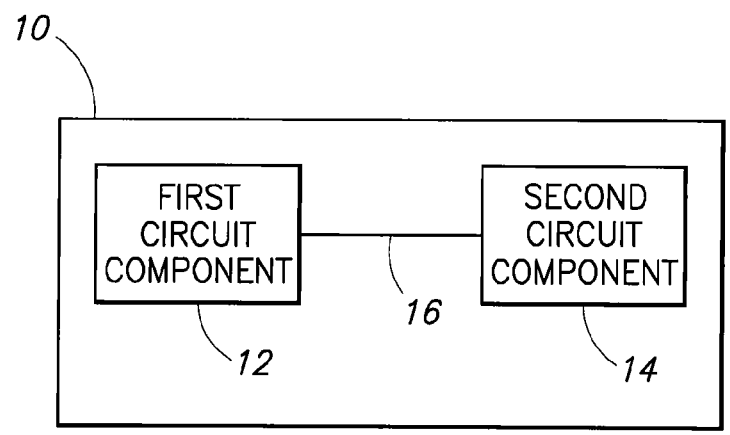
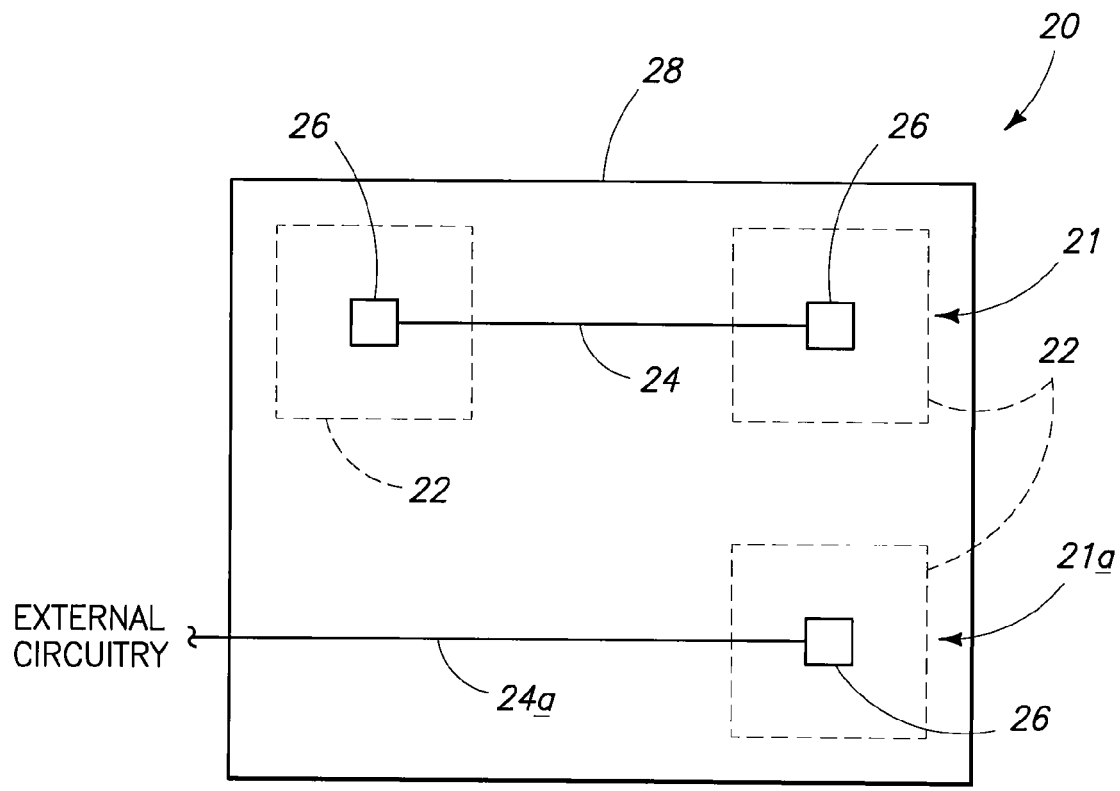

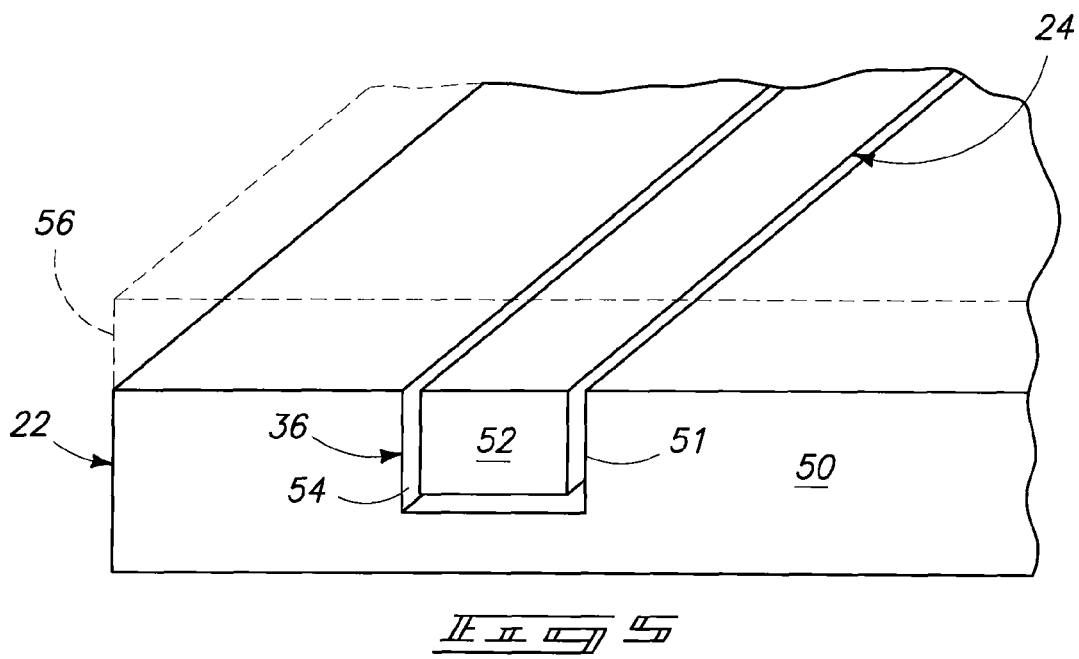
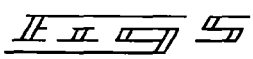
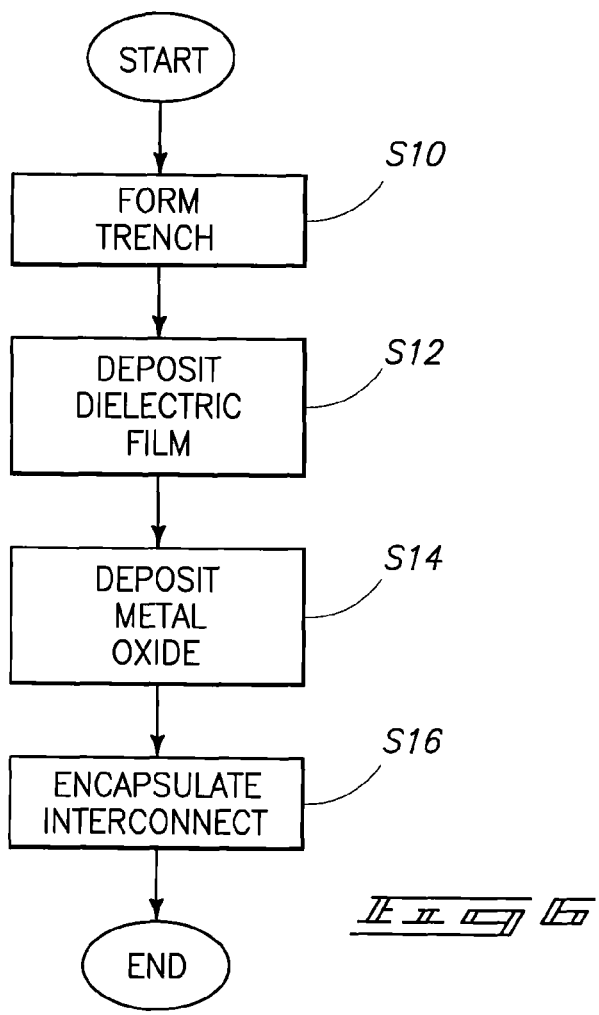

COMMUNICATION METHODS, METHODS OF FORMING AN INTERCONNECT, SIGNAL INTERCONNECTS, INTEGRATED CIRCUIT STRUCTURES, CIRCUITS, AND DATA APPARATUSES

CROSS REFERENCE TO RELATED APPLICATION

This application is a continuation of and claims priority to U.S. patent application Ser. No. 11/515,296, which was filed on Aug. 31, 2006, now U.S. Pat. No. 7,844,142, issued Nov. 30, 2010, and which is incorporated herein by reference.

TECHNICAL FIELD

The technical field relates to communication methods, methods of forming an interconnect, signal interconnects, integrated circuit structures, circuits, and data apparatuses.

BACKGROUND

Designers aim to meet respective demands of a given implementation of a circuit. For example, in some implementations, an aim of a designer may be to provide interconnects of increased communications speeds capable of operating with associated electrical components, such as processors and memory, as the speeds of the respective components themselves continue to increase. Also, the amount of information needed to be communicated within a given circuit implementation may lead to circuit designs which utilize relatively high bandwidth interconnects. There is also a continuing desire in at least some applications for security of data communicated within a given circuit or between circuit components. In some arrangements, data content of information signals may be encrypted to provide increased security of the data content compared with unencrypted implementations.

BRIEF DESCRIPTION OF THE DRAWINGS

FIG. 1 is a functional block diagram of a data apparatus according to one embodiment.

FIG. 2 is an illustrative representation of an integrated circuit structure according to one embodiment.

FIG. 5 is an isometric view of an integrated circuit structure including a signal interconnect according to one embodiment.

FIG. 6 is a flow chart of a method of fabricating a signal interconnect according to one embodiment.

DETAILED DESCRIPTION OF THE ILLUSTRATED EMBODIMENTS

Figure 3:
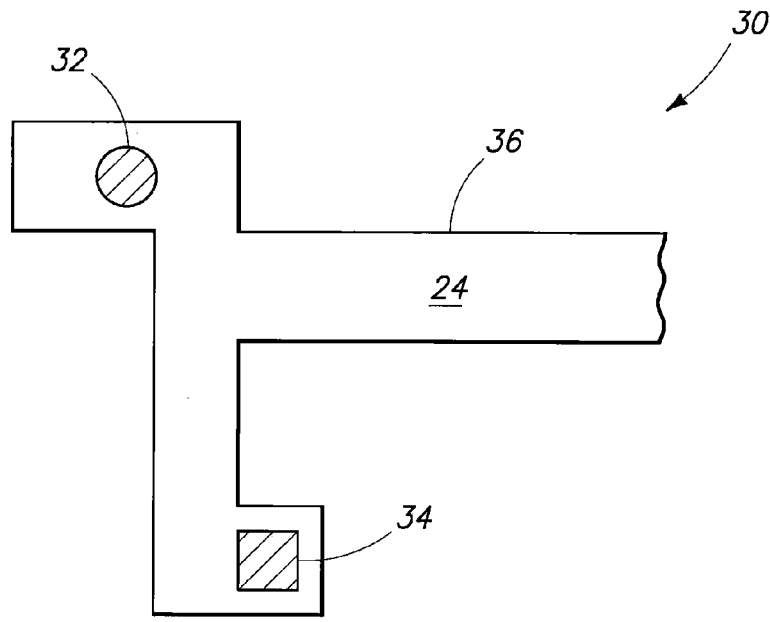
FIG. 3 is an illustrative representation of a circuit including a signal interconnect according to one embodiment.

One embodiment of the invention comprises a signal interconnect configured to transmit different types or classes of electromagnetic signals. Some different types or classes of electromagnetic signals include electrical signals, optical signals, and plasmonic signals. In one embodiment, signals of the different types or classes may be multiplexed and concurrently transmitted using a waveguide of a signal interconnect. As described below, the signal interconnect may be used to transmit signals in different arrangements, for example, within or with respect to integrated circuitry and/or with respect to components of a data apparatus. Other embodiments of the disclosure are described below.

Referring to FIG. 1, a data apparatus of one embodiment is depicted with respect to reference 10. In the illustrated implementation, data apparatus 10 is an electrical device and includes one or more circuit components which individually include electrical circuitry (a plurality of circuit components 12, 14 are illustrated in the embodiment of FIG. 1). One or both of circuit components 12, 14 may comprise an integrated circuit structure. For example, circuit components 12, 14 may individually include processing circuitry and/or storage circuitry in some embodiments as described in further detail below. The depicted data apparatus 10 additionally includes a signal interconnect 16 coupled to the circuit components 12, 14 to communicate signals therebetween and/or with respect to circuitry (not shown) external of data apparatus 10.

In more specific and non-limiting embodiments, data apparatus 10 is a computing device (e.g., personal computer, work station), electrical consumer device (e.g., telephone, personal digital assistant, digital camera, wireless device, display, chip set, set top box, game, vehicle, etc.), or control system. As noted, above-recited embodiments of data apparatus 10 are only illustrative and data apparatus 10 may be implemented in other embodiments which utilize electrical circuitry.

In one embodiment, processing circuitry is arranged to process data, control data access and storage, issue commands, and control other desired operations. Processing circuitry may comprise circuitry configured to implement desired programming provided by appropriate media in at least one embodiment. For example, the processing circuitry may be implemented as one or more of a processor and/or other structure configured to execute executable instructions including, for example, software and/or firmware instructions, and/or hardware circuitry. Embodiments of processing circuitry include hardware logic, PGA, FPGA, ASIC, state machines, and/or other structures alone or in combination with a processor. These embodiments of processing circuitry are for illustration and other configurations are possible.

The storage circuitry is configured to store programming such as executable code or instructions (e.g., software and/or firmware), electronic data, databases, or other digital information and may include processor-usable media. Processor-usable media may be embodied in any computer program product(s) or article of manufacture(s) which can contain, store, or maintain programming, data and/or digital information for use by or in connection with an instruction execution system including processing circuitry in the exemplary embodiment. For example, suitable processor-usable media may include any one of physical media such as electronic, magnetic, optical, electromagnetic, infrared or semiconductor media. Some more specific embodiments of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

As mentioned above, one embodiment of the disclosure comprises multiplexing of a plurality of signals and communicating the multiplexed signals using a signal interconnect. In one embodiment, one of the circuit components 12, 14 of the data apparatus 10 comprises an information source (e.g., processing circuitry, storage circuitry) configured to provide data content of one or more of the signals to be communicated, and the signal interconnect is configured to communicate signals comprising the data content to locations remote from the source of the data content. The signal interconnect configured to communicate multiplexed signals may be implemented as signal interconnect 16, signal interconnects within one or more of circuit components 12, 14 (e.g., signal interconnects 24, 24a described below), combinations of signal interconnect 16 and signal interconnects of components 12, 14, or in other arrangements in other embodiments. One type of signal interconnect which may transmit multiplexed signals includes a signal interconnect of integrated circuitry (e.g., integrated circuitry of one or both of circuit components 12, 14) as described with respect to FIG. 2 in one embodiment.

Referring to FIG. 2, an integrated circuit structure 20 is shown. The depicted integrated circuit structure 20 may be a semiconductor die, vertically integrated multichip package (MCP), stacked or other arrangement of integrated circuitry in various embodiments. As mentioned above, one or both of circuit components 12, 14 may comprise an integrated circuit structure 20.

The depicted integrated circuit structure 20 is described with respect to a chip having a periphery 28 (e.g., periphery 28 corresponds to a footprint of structure 20 in the embodiment of FIG. 2). Structure 20 includes a plurality of circuits 21, 21a, for discussion purposes. More specifically, circuits 21, 21a individually include respective integrated circuit portions 22 and respective signal interconnects 24, 24a. In one embodiment of structure 20, one or both of signal interconnects 24, 24a are implemented as integrated circuitry of the structure 20. In other embodiments, only portions or neither of signal interconnects 24, 24a are implemented as integrated circuitry. In addition, the signal interconnects 24, 24a may be individually connected with one or more of the integrated circuit portions 22 of structure 20. In the specific example of FIG. 2, signal interconnect 24 is connected with respective plural portions 22 of structure 22 via respective connections 26 (e.g., a single one of connections 26 may include optical and electrical contacts) contacting the signal interconnect 24 while signal interconnect 24a connects a single integrated circuit portion 22 via a respective connection 26 with circuitry external of structure 20 (the external circuitry is not shown in FIG. 2). Optical and electrical contacts of a connection 26 may be referred to as optical and electrical interfaces, respectively.

Signal interconnect 24 connects different integrated circuit portions 22 provided at different spatial locations of structure 20 while interconnect 24a connects respective integrated circuitry 22 provided at a first spatial location with another spatial location located at the periphery 28 of structure 20 as well as external circuitry located at yet a different spatial location. In FIG. 2, signal interconnect 24 may be referred to as an on-chip signal interconnect while signal interconnect 24a may be referred to as an off-chip signal interconnect. In other embodiments, one or both of signal interconnects 24, 24a may not be connected with integrated circuitry of structure 20.

Signal interconnects 24, 24a are individually configured to concurrently communicate optical and electrical information signals in one embodiment. In one embodiment, integrated circuit portions 22 may include source circuitry in the form of an optical source (e.g., optical modulator) and/or electrical source (e.g., processing circuitry, memory, buffers, communications interfaces, etc.) configured to generate or otherwise provide optical and electrical information signals, respectively, and which may be communicated via a respective signal interconnect 24, 24a. Integrated circuit portions 22 may include recipient circuitry configured to process optical and electrical information signals received by a respective signal interconnect 24, 24a.

According to one embodiment, filtering of optical information signals may be provided. For example, a filter may control the transmission of at least one wavelength of electromagnetic energy. Filtering of optical signals may be implemented in various embodiments. An embodiment of a filter may include photonic crystals as described in U.S. Patent Publication No. 2005/0263675 A1, published Dec. 1, 2005; U.S. Patent Publication No. 2005/0281524 A1, published Dec. 22, 2005; U.S. Patent Publication No. 2006/0006485 A1, published Jan. 12, 2006; U.S. Patent Publication No. 2006/0186318, published Aug. 24, 2006; and U.S. Patent Publication No. 2006/0186319 A1, published Aug. 24, 2006, the teachings of which are incorporated herein by reference. One or more filters may be formed using one or more of the integrated circuit portions 22 coupled with respective signal interconnects 24, 24a in one embodiment. Photonic crystals may be made of metal oxides using conventional semiconductor processing techniques in one embodiment. Filters including photonic crystals made of metal oxides may transmit electrical signals as well as optical signals.

Referring to FIG. 3, one example of a circuit 30 is shown. The circuit 30 may be part of an integrated circuit structure 20 in some embodiments. The circuit 30 shown in FIG. 3 includes signal interconnect 24 coupled with plural interfaces 32, 34 for communicating a plurality of information signals. For example, interface 32 may be an optical contact configured to communicate optical information signals with respect to circuitry external of circuit 30 (the external circuitry is not shown in FIG. 3). The interface 32 configured as an optical interface may be used for an optical interface to communicate signals with respect to an optical modulator or optical demodulator in illustrative configurations. For example, one optical modulator may be implemented as a high-speed optical modulator using silicon technology based on a MOS capacitor as described in Ansheng Liu et al., "A High-Speed Silicon Optical Modulator Based On A Metal-Oxide-Semiconductor Capacitor," *Nature*, Vol. 427 Feb. 12, 2004, incorporated herein by reference. Other optical modulator configurations may be used in other embodiments. In one embodiment, one of integrated circuit portions 22 may be configured as such an optical modulator. Additionally, a polarized filter may be coupled with optical interface 32 to provide signal selection.

Furthermore, interface 34 of circuit 30 may be an electrical interface configured to communicate electrical information signals with respect to circuitry external of circuit 30. Electrical interface 34 may be an electrical contact which may be connected to a wire, metallization or other conductive structure external of circuit 30 in possible implementations.

The signal interconnect 24 includes a transmission medium configured to communicate optical and electrical information signals. The transmission medium forms a waveguide 36 for multiplexed optical and electrical signal transmission in the described embodiment. The transmission medium of signal interconnect 24 may comprise a material which transmits photons and also conducts electrical data carriers (e.g., electrons or holes) in one embodiment. The material may be a metal oxide, such as indium tin oxide, zinc tin oxide, etc., in various embodiments.

Circuit 30 operates as a multiplexer to concurrently communicate the optical and electrical signals with respect to respective interfaces 32, 34 in one embodiment. Additional interfaces (e.g., optical and electrical interfaces not shown in FIG. 3) may be spatially located from the depicted interfaces 32, 34 and, for example, coupled with a portion of interconnect 24 which extends in a rightward direction in FIG. 3. The transmission medium transmits optical information signals and electrical information signals between spatially located optical and electrical interfaces, respectively, in the described embodiment.

Figure 4:
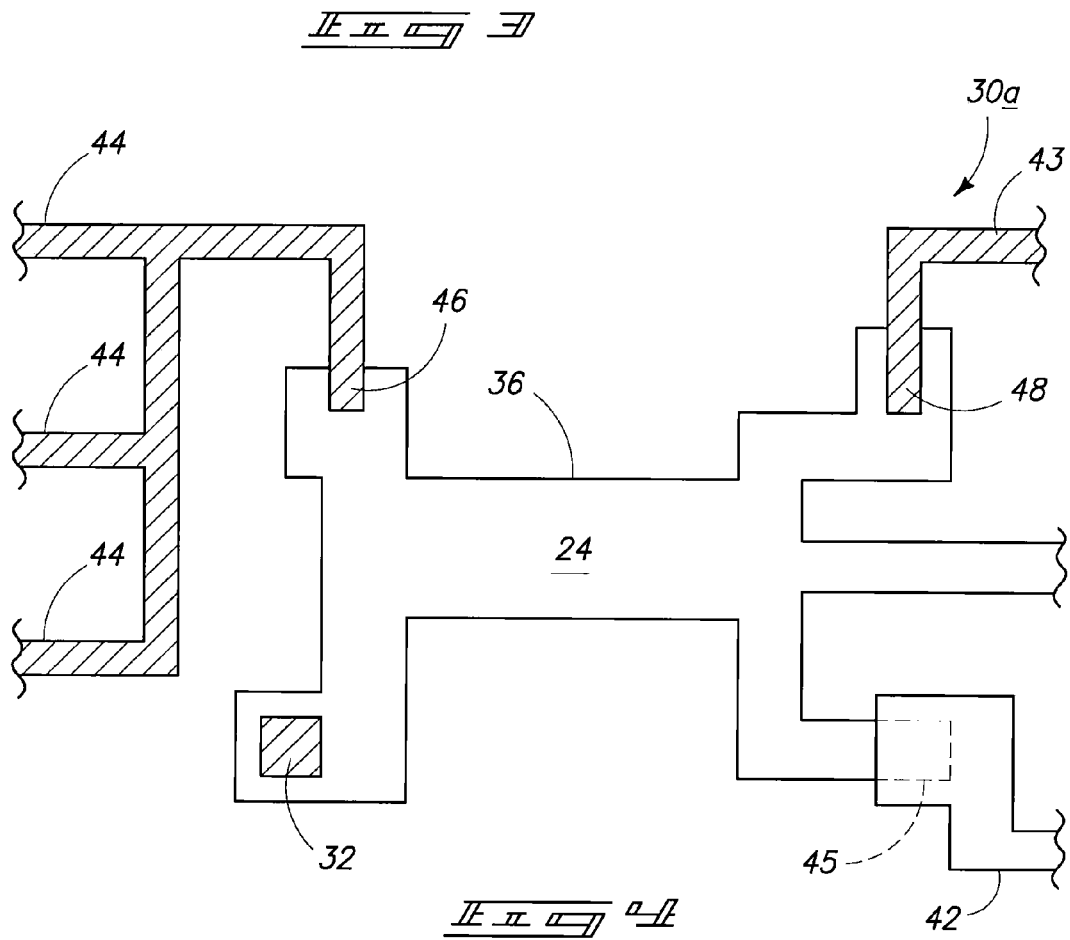
FIG. 4 is an illustrative representation of a circuit including a signal interconnect according to one embodiment.

Referring to FIG. 4, another circuit 30a is shown for communicating optical and electrical signals. The circuit 30a includes signal interconnect 24 in the form of a single interconnect line coupled with an optical interconnect line 42 and a plurality of electrical interconnect lines 43, 44. In the depicted embodiment, signal interconnect 24 is configured to communicate optical signals between optical interface 32 and an optical interface coupled with optical interconnect line 42 at a spatial location 45 while concurrently communicating electrical information signals intermediate electrical interfaces coupled with electrical interconnect lines 43, 44 (and also located at different spatial locations 46, 48). In one embodiment, electrical interconnect lines 44 may be referred to as input lines which may individually correspond to one of a plurality of differently encoding schemes, for example, which may be used to encode data content of an optical information signal. Additional encoding details are described below.

Referring to FIG. 5, additional details regarding one embodiment of signal interconnect 24 formed as integrated circuitry are shown. The illustrated signal interconnect 24 is fabricated using a substrate 50 of an integrated circuit structure 22 in the depicted embodiment. The substrate 50 may comprise a semiconductive material, such as silicon, in one embodiment. Other substrate materials may be used in other configurations.

A trench 51 has been formed within substrate 50 in the depicted embodiment. A transmission medium 52 of the signal interconnect 24 is formed within trench 51 forming a damascene or buried interconnect line in one possible arrangement. The transmission medium 52 may be a material which is substantially transparent to light while also being electrically conductive. According to certain embodiments mentioned above, the transmission medium 52 may be a metal oxide configured to conduct electrical data carriers and transmit photons.

Barrier material 54 may be provided between the sides and bottom of transmission medium 52 and the substrate 50 in one implementation. Barrier material 54 may be a high-k electrically insulative material to provide electrical insulation of electrical information signals conducted by transmission medium 52. In addition, barrier material 54 may have a refractive index different than a refractive index of the transmission medium 52 to provide optical insulation of optical information signals communicated by transmission medium 52. Barrier material 54 may be silicon nitride in one embodiment. Insulative material 56 may be provided over transmission medium 52 of signal interconnect 24 and perhaps other portions of substrate 50 to further electrically and optically insulate transmission medium 52 in one embodiment. The insulated transmission medium 52 provides a waveguide 36 configured to simultaneously transmit multiplexed electrical and optical information signals and which is optically and electrically insulated from neighboring interconnects (not shown) in the illustrated embodiment.

In the embodiment depicted in FIG. 5, transmission medium 52 is a single monolithic material configured to simultaneously communicate a plurality of information signals including optical and electrical signals in one implementation. The transmission medium 52 has a cross-sectional area as shown in FIG. 5 and which may simultaneously pass the optical and electrical information signals.

Referring to FIG. 6, an embodiment of a process is shown for fabricating the embodiment of the signal interconnect 24 depicted in FIG. 5. Other methods of fabrication are contemplated including more, less and/or alternative acts.

At an act S10, a trench may be formed within a substrate, such as silicon. In one embodiment, photolithography may be used to form the trench. The trench may be formed between a plurality of spaced spatial locations to be interconnected by the signal interconnect in one embodiment.

At an act S12, optically and electrically insulative material may be deposited within the trench. In one embodiment, a low temperature (e.g., 200-750 C) PCVD process may be used to deposit a silicon nitride film. The deposition provides silicon nitride on the lower surface and sidewalls of the trench in one embodiment.

At an act S14, the material of the transmission medium providing a waveguide may be deposited within the trench after the formation of the silicon nitride upon the bottom surface and side walls of the trench. One suitable material includes a metal oxide as mentioned above. In addition, the metal oxide may be $SnO_2$ doped in one embodiment to increase electrical conductivity of the transmission medium. In addition, graded index optimization of the transmission medium may be performed for improved transmission characteristics at interfaces and/or to reduce dispersion losses in optical signals. In one example, material of a graded index transmission medium has a refractive index tuned in such a manner that it decreases with increasing distance from a center of the material. In such case, a central portion of the medium has a higher refractive index than outer portions of the medium and light is generally confined to the central portion of the medium which drastically reduces dispersion losses. In one embodiment, a graded index transmission medium may be formed by depositing multiple layers of dielectric with different stoichiometry (composition of elements) thus altering the refractive index.

At an act S16, insulative material may be deposited over the trench and the substrate to encapsulate the formed signal interconnect structure. The insulative material, such as silicon nitride, may provide optical and electrical insulation in one embodiment. Portions of the insulative material over the transmission medium may be patterned and removed to provide electrical and/or optical communication of the signal interconnect with respect to electrical or optical interfaces.

As described above, signal interconnects are described which are configured to communicate a plurality of information signals. For example, as discussed above, optical and electrical signals may be multiplexed and concurrently communicated using a common signal interconnect. According to one embodiment, one of the multiplexed signals may include information regarding another of the multiplexed signals.

In a more specific embodiment, data content of a first of the information signals (e.g., optical information signal) may be encoded or encrypted. A second of the information signals (e.g., electrical information signal) may include information regarding a scheme used to encode or encrypt respective data content of the first information signal and/or information regarding optical modulation of the first information signal and which may be used to decode, demodulate and/or decrypt data content of the first of the information signals in one specific embodiment. In addition, encoding or encryption may change in real time, "on the fly." The second information signal may provide encoding or encryption information in real time and indicate changes in encoding or encryption of the data content at different moments in time according to changes in the encoding or encryption of respective portions of the data content. In one embodiment, an encoder may be configured as a source to generate the electrical signal which includes information regarding the encoding or encryption of data content of the optical signal which may be generated by a respective different source (e.g., data content may be generated by processing circuitry).

Optical interconnects provide advantages for data or signal transmission. For example, photons do not suffer from R, C parasitics and provide wider bandwidth compared with electrons. The interconnects may be used for on-chip signal transmission, off-chip signal transmission between different IC dies, and/or signal transmission in vertically integrated multi-chip packages (MCPs) in illustrative implementations. At least some of the signal interconnects described herein provide relatively wide bandwidth and relatively high signal/noise ratios (e.g., it is believed that signal/noise ratios in excess of 80% may be achieved in certain embodiments). Further, at least some of the signal interconnects may be implemented using conventional CMOS technologies.

Some embodiments have been described herein with respect to optical and electrical signals. The optical signals and electrical signals use different classes of data carriers to transmit information in the described embodiment. The different classes of data carriers correspond to different types of particles or waves corresponding to different portions of the electromagnetic spectrum. For example, in one embodiment using optical and electrical signals, the data carriers include photons and electrons (or holes), respectively. Other signals may be utilized in other embodiments. For example, one of the information signals may be a plasmonic wave utilizing data carriers in the form of plasmons to transmit information. Some arrangements using plasmonic waves utilize localized surface plasmonic resonance (LSPR) comprising plasmon resonance in nanoscale metallic surfaces or Surface Plasmon Resonance (SPR) comprising plasmon resonance in planar surfaces of relatively larger areas.

In compliance with the statute, the subject matter disclosed herein has been described in language more or less specific as to structural and methodical features. It is to be understood, however, that the claims are not limited to the specific features shown and described, since the means herein disclosed comprise only some of the various contemplated embodiments. The claims are thus to be afforded full scope as literally worded, and to be appropriately interpreted in accordance with the doctrine of equivalents.

Further, details herein have been presented for guidance in construction and/or operation of the disclosed embodiments. Applicant(s) hereof consider these described embodiments to also include, disclose and describe further arrangements or embodiments in addition to those explicitly disclosed. For example, the additional embodiments may include less, more and/or alternative features than those described in the specifically described embodiments. More specifically, Applicants consider the disclosure to include, disclose and describe methods which include less, more and/or alternative acts than those methods explicitly disclosed as well as apparatus which includes less, more and/or alternative structure than the explicitly disclosed structures.

I claim:

1. A communications method comprising:
using an interconnect, concurrently communicating a first signal comprising encoded data content and a second signal comprising information regarding encoding of the encoded data content of the first signal.

2. The method of claim 1 wherein the concurrently communicating comprises concurrently communicating the first signal which is an optical signal and the second signal which is an electrical signal.

3. The method of claim 2 wherein the concurrently communicating comprises concurrently communicating photons of the optical signal and electrical data carriers of the electrical signal using a transmission medium of the interconnect.

4. The method of claim 1 wherein the concurrently communicating comprises communicating using the interconnect comprising a metal oxide.

5. A method of forming an interconnect comprising:
providing a transmission medium which is configured to communicate a plurality of photons and a plurality of electrical data carriers;
electrically insulating the transmission medium from a substrate; and
optically insulating the transmission medium from the substrate.

6. The method of claim 5 wherein the transmission medium comprises a monolithic transmission medium which is configured to transmit the photons and to conduct the electrical data carriers.

7. The method of claim 5 wherein the transmission medium comprises a metal oxide.

8. The method of claim 5 further comprising forming a trench in the substrate, and wherein the providing comprises providing the transmission medium within the trench.

9. The method of claim 5 wherein the electrically insulating and the optically insulating comprise electrically and optically insulating using at least one optical and electrical insulating material having a refractive index which is different than a refractive index of material of the transmission medium.

10. The method of claim 5 further comprising coupling the transmission medium with a connection of an integrated circuit structure.

11. A circuit comprising:
a plurality of optical interfaces which are spaced from one another;
a plurality of electrical interfaces which are spaced from one another; and
an interconnect configured to concurrently transmit a plurality of photons of an optical information signal between the plurality of optical interfaces and a plurality of electrical data carriers of an electrical information signal between the plurality of electrical interfaces.

12. The circuit of claim 11 wherein the interconnect comprises a waveguide.

13. The circuit of claim 11 wherein the interconnect comprises a transmission medium which is configured to concurrently transmit the photons and the electrical data carriers.

14. The circuit of claim 13 wherein the transmission medium comprises a metal oxide.

15. The circuit of claim 13 wherein the transmission medium is a graded index transmission medium comprising a plurality of different refractive indices.

16. The circuit of claim 13 further comprising an optical filter coupled with the transmission medium and configured to control transmission of at least one wavelength.

17. The circuit of claim 16 wherein the optical filter comprises photonic crystals.

18. The circuit of claim 11 wherein the interconnect comprises a monolithic transmission medium which is configured to concurrently transmit the photons and the electrical data carriers.

19. The circuit of claim 11 wherein at least one of the optical interfaces and the electrical interfaces is located within a periphery of an integrated circuit structure.

20. An integrated circuit structure comprising:
a substrate; and
a transmission medium configured to concurrently transmit a plurality of photons of an optical signal between a plurality of different spatial locations of the substrate and a plurality of electrical data carriers of an electrical signal between a plurality of different spatial locations of the substrate.

21. The structure of claim 20 further comprising:
integrated circuitry; and
a connection coupled with the transmission medium and the integrated circuitry, and wherein the connection is provided at one of the spatial locations of the substrate.

22. The structure of claim 21 further comprising another connection coupled with the transmission medium, and wherein the another connection is provided at another of the spatial locations of the substrate.

23. The structure of claim 20 wherein the transmission medium comprises integrated circuitry.

24. The structure of claim 20 wherein the substrate comprises a trench, and wherein the transmission medium is within the trench.

25. The structure of claim 20 further comprising an insulative material adjacent to at least a portion of the transmission medium, and wherein the insulative material has a refractive index which is different than a refractive index of the transmission medium.

26. The structure of claim 25 wherein the insulative material is configured to electrically insulate at least the portion of the transmission medium from the substrate.

27. The structure of claim 20 further comprising an optical modulator configured to generate the optical signal.

28. The structure of claim 20 wherein the transmission medium comprises a metal oxide.

29. A circuit comprising:
an optical source configured to provide optical signals comprising photons;
an electrical source configured to provide electrical signals comprising electrical data carriers; and
an interconnect optically coupled with the optical source and configured to receive the photons of the optical signals from the optical source and to transmit the photons of the optical signals remotely from the optical source, and wherein the interconnect is electrically coupled with the electrical source and configured to receive the electrical data carriers of the electrical signals from the electrical source and to transmit the electrical data carriers remotely from the electrical source.

30. The circuit of claim 29 wherein the interconnect comprises a metal oxide.

31. The circuit of claim 29 wherein the optical source, the electrical source and the interconnect comprise circuitry of an integrated circuit structure.

32. The circuit of claim 29 wherein the interconnect comprises a structure of an integrated circuit structure and the interconnect is coupled with a plurality of connections of the integrated circuit structure which are at locations remote from the optical source and the electrical source.

33. The circuit of claim 29 wherein the interconnect is circuitry of an integrated circuit structure and the interconnect is configured to transmit at least one of the photons and the electrical data carriers to a location external of the integrated circuit structure.

34. The circuit of claim 29 wherein the interconnect is circuitry of an integrated circuit structure and the interconnect is configured to transmit the photons and the electrical data carriers to at least one location external of the integrated circuit structure.

35. The circuit of claim 29 wherein the interconnect comprises a single monolithic material which is configured to simultaneously communicate the photons and the electrical data carriers.

36. A circuit comprising:
a first information source configured to provide first signals comprising data content;
a second information source configured to provide second signals comprising information regarding the first signals; and
an interconnect coupled with the first and second information sources and configured to receive the first and second signals from the first and second information sources and to transmit the first and second signals remotely from the first and second information sources.

37. The circuit of claim 36 wherein the signal interconnect is configured to concurrently transmit the first and second signals.

38. The circuit of claim 36 wherein the signal interconnect is configured to transmit photons of the first signals which are optical signals and to transmit electrical data carriers of the second signals which are electrical signals.

39. The circuit of claim 36 wherein the first signals comprise encoded data content, and the second signals comprise information regarding encoding of the encoded data content.

40. A data apparatus comprising:
an information source configured to provide a first information signal to be communicated;
an interconnect coupled with the information source and configured to receive the first information signal from the information source and to concurrently transmit the first information signal with a second information signal which comprises information which is different than information of the first information signal; and
wherein the interconnect is configured to concurrently transmit a plurality of photons of one of the first and second information signals which comprises an optical signal with a plurality of electrical data carriers of another of the first and second information signals which comprises an electrical signal.

41. The apparatus of claim 40 wherein the information source is configured to provide the second information signal.

42. The apparatus of claim 40 wherein the information source comprises a component of a computing device.

43. The apparatus of claim 40 wherein the information source comprises processing circuitry of a computing device.

44. The apparatus of claim 40 wherein the information source comprises memory of a computing device.

* * * * *